United States Patent Office 2,975,160
Patented Mar. 14, 1961

2,975,160

PREPARATION OF COPOLYMERS IN THE PRESENCE OF AN ORGANO-LITHIUM CATALYST AND A SOLVENT MIXTURE COMPRISING A HYDROCARBON AND AN ETHER, THIOETHER OR AMINE

Robert P. Zelinski, Bartlesville, Okla., assignor to Phillips Petroleum Company, a corporation of Delaware No Drawing. Filed May 23, 1958, Ser. No. 737,207

16 Claims. (Cl. 260—83.7)

This invention relates to the preparation of copolymers. In one aspect, the invention relates to a method for preparing copolymers of certain selected conjugated dienes and other unsaturated compounds, utilizing an organolithium compound as the catalyst.

It has recently been discovered that block polymers can be prepared by a process which employs organolithium compounds as the polymerization catalyst. In one method, block polymers are prepared by simultaneously charging certain monomers to a polymerization zone. In another method for the preparation of block polymers, the polymerization of one monomer is completed after which another monomer is charged to the polymerization zone. In accordance with the instant process, a novel method is provided for preparing copolymers in which an organolithium compound is utilized as the catalyst.

It is an object of this invention to provide a method for preparing copolymers of certain selected conjugated dienes and other unsaturated compounds.

Another object of the invention is to provide a process for preparing copolymers in the presence of an organolithium catalyst.

Other and further objects and advantages of the invention will become apparent to those skilled in the art upon consideration of the following disclosure.

The instant invention resides in the discovery of a process whereby copolymers of certain selected monomers can be prepared in the presence of an organolithium catalyst. Broadly speaking, the process comprises contacting at least two members selected from the group consisting of 1,3-butadiene, 2-methyl-1,3-butadiene (isoprene), 1,3-pentadiene (piperylene), vinyl-substituted aromatic hydrocarbons, vinyl halides, vinylidene halides, esters of acrylic acid and esters of homologues of acrylic acid with an organolithium compound in the presence of a solvent mixture comprising (1) a hydrocarbon selected from the group consisting of aromatic hydrocarbons, paraffins and cycloparaffins, and (2) a polar organic compound. In general, the polar compound used in the solvent mixture is one which does not inactivate the organolithium compound. It is preferred that one of the monomeric materials used in the process be one of the conjugated dienes, i.e., 1,3-butadiene, 2-methyl-1,3-butadiene or 1,3-pentadiene. It is also preferred that two monomers in a weight ratio of 5:95 to 95:5 be utilized in the practice of this invention in order to produce a binary copolymer.

Any suitable vinyl-substituted aromatic hydrocarbon can be employed in the process of this invention. However, it is to be understood that compounds containing substituents on the alpha carbon, such as alpha-methylstyrene, are not applicable to the instant process. Examples of suitable vinyl-substituted aromatic hydrocarbons include styrene, divinylbenzene, 3-vinyltoluene, 1-vinylnaphthalene, 2-vinylnaphthalene, 3-methylstyrene, and the like.

As heretofore indicated, vinyl halides and vinylidene halides can be used in the practice of this invention. Examples of suitable halides include vinyl chloride, vinyl bromide, vinylidene chloride, and the like. Esters of acrylic acid and esters of homologues of acrylic acid can also be employed in preparing the copolymers of this invention. Examples of such compounds include methyl methacrylate, ethyl acrylate, ethyl ethacrylate, methyl acrylate, ethyl methacrylate, methyl proacrylate, propyl acrylate, n-butyl acrylate, phenyl methacrylate, and the like.

As mentioned hereinbefore, the polymerization is carried out in the presence of a solvent mixture comprising a hydrocarbon selected from the group consisting of aromatic hydrocarbons, paraffins and cycloparaffins, and a polar compound which does not inactivate the organolithium compound employed as the catalyst. The solvent mixture is one which is liquid under the conditions of the process. Examples of suitable hydrocarbons which can be used as one of the components of the two-component solvent mixture include propane, isobutane, n-pentane, isooctane, n-dodecane, cyclopentane, cyclohexane, methylcyclopentane, ethylcyclopentane, dimethylcyclopentane, ethylcyclohexane, benzene, toluene, xylene, ethylbenzene, naphthalene, and the like. Mixtures of these various materials can also be employed. Examples of polar compounds which do not inactivate the organolithium catalyst and which may, therefore, be used as a second component of the solvent mixture are ethers, thioethers (sulfides) and tertiary amines. Specific examples of such polar materials include dimethyl ether, diethyl ether, ethyl methyl ether, ethyl propyl ether, di-n-propyl ether, di-n-octyl ether, dibenzyl ether, diphenyl ether, anisole, tetramethylene oxide (tetrahydrofuran), 1,2-dimethyoxyethane, dioxane, paraldehyde, dimethyl sulfide, diethyl sulfide, di-n-propylsulfide, di-n-butyl sulfide, methyl ethyl sulfide, dimethylethylamine, tri-n-propylamine, tri-n-butylamine, trimethylamine, triethylamine, N,N-dimethylaniline, pyridine, quinoline, N-ethylpiperidine, N-methyl-N-ethylaniline, N-methylmorpholine, and the like. It is to be understood also that mixtures of these polar compounds can be employed in the practice of the instant invention.

It has been discovered that the presence of the polar compound in the solvent mixture as described hereinabove results in the formation of the copolymers of this invention. If the polar compound is not used, e.g., in the polymerization of butadiene and styrene, a block polymer is formed as described in my copending U.S. patent application Serial No. 721,293, filed on March 6, 1958. In general, the amount of polar compound used in the solvent mixture is that which is necessary to cause the desired copolymerization of the monomeric materials. The amount generally falls in the range of 0.005 to 50 weight percent of the total solvent mixture. In the case of dialkyl ethers, it is preferred that the solvent mixture contain at least 1 percent by weight, more desirable at least 3 percent by weight, of these polar compounds. With certain of the more active polar compounds, lesser amounts can be utilized. For example, heterocyclic ethers, such as tetrahydrofuran, can be employed in amounts ranging from 0.1 to 50 weight percent while diethers, such as 1,2-dimethyoxyethane, can be used in amounts ranging from 0.005 to 50 weight percent of the total solvent. The remainder of the solvent mixture is an aromatic, paraffinic or cycloparaffinic hydrocarbon as mentioned hereinabove.

The organolithium compound used as a catalyst in the practice of the process of this invention corresponds to the general formula $R(Li)_x$, wherein R is a hydrocarbon radical selected from the group consisting of aliphatic, cycloaliphatic and aromatic radicals and $x$ is an integer from 1 to 4, inclusive. The R group has a valence equal to the integer $x$ and preferably contains from 1 to 20, inclusive, carbon atoms, although it is within the scope of the invention to use higher molecular weight compounds. Examples of organolithium compounds which can be used include methyllithium, isopropyllithium, n-butyllithium, tert-octyllithium, n-decyllithium, phenyllithium, naphthyllithium, 4 - butylphenyllithium, p-tolyllithium, 4 - phenylbutyllithium, cyclohexyllithium, 4-butylcyclohexyllithium, 4 - cyclohexylbutyllithium, dilithiomethane, 1,4 - dilithiobutane, 1,10 - dilithiodecane, 1,20-dilithioeicosane, 1,4-dilithiocyclohexane, 1,4-dilithiobutene-2, 1,8-dilithio-3-decene, 1,4-dilithiobenzene, 1,5 - dilithionaphthalene, 1,2-dilithio-1,2-diphenylethane, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, and the like.

The polymerization process of this invention can be carried out at any temperature within the range of about −80 to 150° C., but it is preferred to operate in the range of −20 to 80° C. The polymerization reaction can be carried out under autogenous pressures. It is usually desirable to operate at pressures sufficient to maintain the monomeric materials substantially in the liquid phase. The pressure will thus depend upon the particular materials being polymerized, the solvent mixture being employed, and a temperature at which the polymerization is carried out. However, higher pressures can be employed, if desired, these pressures being obtained by some such suitable method as the pressurization of the reactor with a gas which is inert with respect to the polymerization reaction.

The amount of the organolithium compound employed in the polymerization can vary over a rather wide range. In general, the amount should be at least 0.02 part by weight per 100 parts by weight of the monomers to be polymerized. The upper limit for the amount of the organolithium compound to be used depends largely upon the desired inherent viscosity of the copolymer obtained in the polymerization. The inherent viscosity of the polymer product decreases with increasing amounts of the organolithium catalyst. A desirable catalyst level is from 0.1 to 2.0 parts by weight of organolithium per 100 parts by weight of the total monomers charged to the polymerization zone.

The process of this invention can be carried out as a batch process by charging the monomeric materials into a reactor containing the organolithium catalyst and the solvent mixture. The process can also be practiced in a continuous manner by maintaining the above-mentioned concentrations of reactants in the reactor for a suitable residence time. The residence time in a continuous process will, of course, vary within rather wide limits of depending upon such variables as reaction temperature, pressure, the amount of catalyst used, and the monomeric materials which are being polymerized. In a continuous process, the residence time generally falls within the range of one second to one hour when conditions within the specified ranges are employed. When a batch process is being utilized, the time for the reaction can be as high as 24 hours or more, although it is generally less than 24 hours.

Various materials are known to be destructive to the organolithium catalyst of this invention. These materials include carbon dioxide, oxygen, water, alcohols, mercaptans, and primary and secondary amines. It is highly desirable, therefore, that the monomers be freed of these materials, as well as other materials which tend to inactivate the catalyst. Any of the known means for removing such contaminants can be used. Also, it is preferred that the solvent mixture used in the process be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. However, the amount of water which may be tolerated in the mixture is insufficient to completely deactivate the catalyst.

At the completion of the polymerization reaction, when a batch process is used, the total reaction mixture is then treated to inactivate the catalyst and recover the polymer product. While it is to be understood that any suitable treating method can be employed, one method for accomplishing the desired treatment comprises adding to the reaction mixture a catalyst-inactivating material such as water, an alcohol, e.g., ethyl alcohol or isopropyl alcohol, an organic or inorganic acid, or the like. It is generally preferred to add only an amount of the catalyst-inactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst deactivating agent and the antioxidant, the polymer present in the solution can then be precipitated by the addition of an excess of a material such as ethyl alcohol or isopropyl alcohol. It is to be understood that deactivating of the catalyst and precipitation of the polymer can be accomplished in a single step. The precipitated polymer can then be recovered by filtration, decantation, or the like. In order to further purify the polymer, the separated polymer can be redissolved in a suitable solvent and then again precipitated by the addition of an alcohol. Thereafter, the polymer is again recovered by a suitable separation means, as indicated hereinbefore, and dried. Any suitable hydrocarbon solvent can be used in this purification step to redissolve the polymer. When the process of the invention is carried out continuously, the total effluent from the reactor can be pumped from the reactor to a catalyst-inactivating zone wherein the reactor effluent is contacted with a suitable catalyst-inactivating material, such as an alcohol. When an alcohol is used as a catalyst-inactivating material, it can also function to precipitate the polymer. In the event other catalyst-inactivating materials are employed which do not perform this dual role, a suitable material, such as an alcohol, can then be added to precipitate the polymer. It is, of course, to be realized that it is within the scope of the invention to employ other suitable means to recover the polymer from solution. After separation from the solvent mixture and alcohol by filtration or other suitable means, the polymer is dried. The polymer can also be redissolved in a suitable diluent and again precipitated, as described above, in order to further purify the material. The solvent mixture and alcohol can in all cases be separated, for example, by fractional distillation, and reused in the process. As hereinbefore mentioned, it is within the scope of the invention to utilize an anti oxidant in the process to prevent oxidation of the polymer. The antioxidant can be added to the reaction mixture prior to precipitation of the polymer, to the solution of redissolved polymer, or to the solvent in which the polymer is to be subsequently redissolved.

The copolymers produced in accordance with this invention are rubbery polymers. The term "rubbery polymer" includes elastomeric, vulcanizable polymeric material which after vulcanization, i.e., crosslinking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. The rubbery copolymers can be compounded by any of the known methods such as have been used in the past for compounding natural rubber. Vulcanization accelerators, reinforcing agents, and fillers such as have been employed in natural rubber can likewise be used in compounding the copolymers of this invention.

A more comprehensive understanding of the invention can be obtained by referring to the following illustrative examples which are not intended, however, to be unduly limitative of the invention.

EXAMPLE I

A series of runs was made in which butadiene-styrene copolymers were prepared by the method of this invention. Homopolymers of butadiene and styrene were also prepared for purposes of comparison.

The n-butyllithium solutions used in these runs were prepared in the following manner. A 1000 milliliter three-necked flask, fitted with a reflux condenser, a dropping funnel with a gas outlet sidearm, and a high speed stirrer, was swept with prepurified nitrogen and charged with 200 milliliters of dry, olefin-free petroleum ether and 3.8 grams of lithium wire which was cut into lengths of about 0.5 centimeter. The dropping funnel was then attached, and a solution of 23 grams of 1-chlorobutane in 100 milliliters of petroleum ether was charged to the dropping funnel. The stirrer was then started and brought to high speed, and the chlorobutane solution was added without cooling at a rate such as to maintain gentle reflux. Upon completion of the addition of the chlorobutane solution, stirring was continued for from 1 to 2 hours, after which the mixture was allowed to stand overnight. The contents of the flask were then transferred to a container by a suitable suction arrangement through 1/8 inch stainless steel tubing. The container was then centrifuged and the supernatant n-butyllithium solution was carefully pressured into a dry, nitrogen-filled bottle. Analysis showed that the solution was about 0.47 molar with respect to n-butyllithium.

The polymerization runs described herein were conducted in 7- and 12-ounce beverage bottles which were first charged with the appropriate amount of dried reaction solvent. Prepurified nitrogen was dispersed through a fritted glass tube and bubbled through the solvent at the rate of 3 liters per minute for from 3 to 20 minutes. For 10 to 20 gram monomer charges, the bottles were first capped with rubber gaskets and metal caps, and the monomers and the organolithium compound were introduced in that order by means of a syringe. Large monomer charges were weighed in before capping. The charged bottles were then agitated in constant temperature baths for the required polymerization time.

To terminate polymerization, 50 to 100 milliliters of a benzene or toluene solution containing about 5 weight percent isopropyl alcohol and 2 weight per cent phenyl-beta-naphthylamine was added. The amine was added to serve as an antioxidant.

The following polymerization recipes were employed in these runs:

|  | Parts by Weight | | |
|---|---|---|---|
|  | A | B | C |
| Butadiene | 100 | none | 75 |
| Styrene | none | 100 | 25 |
| Cyclohexane | 780 | 780 | 780 |
| Diethyl ether | 25 | 25 | 25 |
| n-Butyllithium (4.0 mmoles) | 0.26 | 0.26 | 0.26 |
| Temperature, ° C. | 50 | 50 | 50 |
| Time, hours | variable | variable | variable |

The results of these runs are set forth below in Table I. The dashes in this table indicate that the properties were not determined.

Table I

| Run No. | Recipe | Time, Min. | Conversion, Percent [1] | Inherent Viscosity | Refractive Index @ 25° C. | Styrene Weight Percent [2] |
|---|---|---|---|---|---|---|
| 1 | A | 10 | 29 | --- | --- | --- |
| 2 | A | 20 | 72 | --- | --- | --- |
| 3 | A | 30 | 86 | --- | --- | --- |
| 4 | A | 45 | 93 | --- | --- | --- |
| 5 | A | 60 | 91 | --- | --- | --- |
| 6 | A | 75 | 99 | --- | --- | --- |
| 7 | A | 90 | 100 | --- | --- | --- |
| 8 | A | 120 | 100 | --- | 1.5148 | --- |
| 9 | B | 15 | 97 | --- | --- | --- |
| 10 | B | 30 | 95 | --- | --- | --- |
| 11 | C | 15 | 45 | 0.65 | 1.5291 | 17 |
| 12 | C | 30 | 75 | 0.78 | 1.5311 | 20 |
| 13 | C | 45 | 85 | 0.70 | 1.5311 | 20 |
| 14 | C | 60 | 89 | 0.71 | 1.5339 | 23 |
| 15 | C | 75 | 91 | 0.79 | 1.5354 | 24.5 |
| 16 | C | 90 | 92 | 0.77 | 1.5352 | 24.5 |
| 17 | C | 10 | 21 | --- | 1.5267 | 14.5 |
| 18 | C | 20 | 68 | --- | 1.5290 | 16 |
| 19 | C | 30 | 72 | --- | 1.5299 | 18 |
| 20 | C | 45 | 85 | --- | 1.5319 | 21 |
| 21 | C | 60 | 91 | --- | 1.5332 | 22.5 |
| 22 | C | 75 | 95 | --- | 1.5346 | 24 |
| 23 | C | 90 | 93 | --- | 1.5348 | 24.5 |
| 24 | C | 105 | 94 | --- | 1.5381 | 22 |
| 25 | C | 120 | 94 | --- | 1.5351 | 25 |

[1] In this and subsequent examples, indicates percent of total monomers converted to polymers.
[2] The bound styrene values in this and succeeding examples were obtained from a graph of refractive indexes at 25° C. versus styrene content. The two reference points were averaged refractive indexes of butadiene-styrene (75/25) copolymer and butadiene homopolymer. In this and subsequent examples, samples used in refractive index determinations contained no antioxidant.

The runs in the above table carried out according to recipe C illustrate the process of the present invention. From a consideration of the data from these runs, it is seen that styrene enters the polymer chain during the entire conversion and that butadiene is present all the way up to 100 percent conversion. The amount of styrene going into the polymer chain increases with conversion, and when the conversion reaches a level of 85 to 90 percent, the amount of butadiene remaining is quite small.

EXAMPLE II

A series of runs was carried out according to the procedure of Example I, except that no ether was present in the diluent. The polymerization recipe used in these runs was as follows:

|  | Parts by weight |
|---|---|
| 1,3-butadiene | 75 |
| Styrene | 25 |
| Cyclohexane | 780 |
| n-Butyllithium | 0.26 |
| Temperature, ° C. | 50 |
| Time, hours | Variable |

The results of the runs are set forth hereinbelow in Table II.

Table II

| Run No. | Reaction Time, hrs. | Conv., Percent | Inherent Viscosity | Refractive Index@ 25° C. | Styrene Weight, Percent |
|---|---|---|---|---|---|
| 26 | 1 | 42 | 0.73 | 1.5201 | 3.0 |
| 27 | 2 | 77 | 0.73 | 1.5222 | 5.5 |
| 28 | 3 | 70 | 0.74 | 1.5207 | 3.5 |
| 29 | 4 | 77 | 0.91 | 1.5226 | 6.0 |
| 30 | 5 | 100 | 0.88 | 1.5358 | 24.5 |
| 31 | 6 | 99 | 0.95 | 1.5362 | 25.0 |

From an examination of the styrene contents at various conversions as shown in Table II, it is seen that the polymerization of a butadiene-styrene mixture with a butyllithium catalyst produced block polymers containing two blocks when no ether was present in the diluent. The first block is a butadiene-styrene copolymer containing a small amount of styrene while the second block is a styrene homopolymer. However, when a polar compound, such as diethyl ether, is included in the diluent as in Example I (recipe C), the polymer product at the various conversions contained about the same relative amount of bound styrene, indicating the formation of a copolymer.

EXAMPLE III

Several runs were made according to the procedure of Example I in which isoprene-styrene copolymers were prepared. The polymerization recipe employed in these runs was as follows:

| | Parts by weight |
|---|---|
| Isoprene | 75 |
| Styrene | 25 |
| Cyclohexane | 780 |
| Diethyl ether | 25 |
| n-Butyllithium | 0.26 (4.0 millimole) |
| Temperature, °F. | 122 (50° C.) |
| Time, minutes | Variable |

The results of these runs are set out hereinbelow in Table III.

Table III

| Run No. | Time, min. | Conv., Percent | Inherent Viscosity | Refractive Index @ 25° C. | Bound Styrene Weight, Percent |
|---|---|---|---|---|---|
| 32 | 15 | 14 | 0.71 | 1.5336 | 23.0 |
| 33 | 15 | 1 22 | 0.71 | 1.5304 | 18.5 |
| 34 | 30 | 50 | 0.87 | 1.5340 | 23.5 |
| 35 | 45 | 67 | 1.05 | 1.5349 | 24.5 |
| 36 | 60 | 85 | 1.02 | 1.5352 | 25.0 |
| 37 | 90 | 92 | 1.07 | 1.5355 | 25.5 |
| 38 | 120 | 95 | 1.11 | 1.5355 | 25.5 |
| 39 | 150 | 100 | 0.97 | 1.5357 | 25.5 |
| 40 | 180 | 98 | not meas. | 1.5355 | 25.5 |

1 Conversion in this run was determined by distilling off solvent and unreacted monomer at 1-2 mm. Hg absolute and 140 to 160° F. In all other runs, conversion was determined by coagulation with isopropyl alcohol.

The data in Table III show that the products at the various conversions contained about the same amount of bound styrene. This copolymer product is to be distinguished from the block polymer product of Example II, which is formed of a copolymer block containing only a small amount of styrene and a homopolymer block of styrene.

EXAMPLE IV

A series of runs was carried out in which butadiene-syrene copolymers were prepared by a butyllithium-catalyzed polymerization. These runs were carried out by the procedure described in Example I, using the following polymerization recipes:

| | Parts by Weight | | |
|---|---|---|---|
| | A | B | C |
| Butadiene | 75 | 50 | 50 |
| Styrene | 25 | 50 | 50 |
| Cyclohexane | 780 | 780 | 780 |
| Butyllithium | 1 4 | 1 4 | 1 4 |
| Polar compound: | | | |
| 1,2-dimethoxyethane | Variable | 0 | 0 |
| tetrahydrofuran | 0 | Variable | Variable |
| Time | Variable | Variable | Variable |
| Temperature, °C | 50 | 50 | 30 |

1 Millimoles per 100 parts of monomers.

The runs which were made according to the above recipes were carried out using a charge order of cyclohexane, butadiene, styrene, polar compound and butyllithium. In the runs employing tetrahydrofuran, this material was charged as a 1 percent solution by volume in cyclohexane. In the runs employing 1,2-dimethoxyethane, this material was charged as a 5 percent by volume solution in cyclohexane. The results of these runs are shown below in Table IV.

Table IV

| Run No. | Recipe | Parts by Wt. Polar Compound | Time, hours | Conv., Percent | Refractive Index @ 25° C. | Bound Styrene, Weight, Percent |
|---|---|---|---|---|---|---|
| 41 | A | 0.2 | 0.1 | 70 | 1.5268 | 20 |
| 42 | A | 0.2 | 0.16 | 88 | 1.5288 | 22.5 |
| 43 | A | 0.2 | 0.25 | 95 | 1.5299 | 24 |
| 44 | A | 0.2 | 0.38 | 100 | (1) | (1) |
| 45 | A | 0.5 | 0.25 | 100 | (1) | (1) |
| 46 | A | 0.5 | 0.4 | 100 | 1.5311 | 25 |
| 47 | B | 25 | 0.28 | 87 | (1) | (1) |
| 48 | B | 25 | 0.53 | 100 | (1) | (1) |
| 49 | C | 25 | 0.5 | 90 | 1.5260 | 22.5 |
| 50 | C | 25 | 0.75 | 97 | 1.5279 | 24.5 |
| 51 | C | 25 | 1.11 | 100 | 1.5288 | 25 |

1 Not measured.

EXAMPLE V

A run was conducted in which a butadiene-styrene copolymer was prepared according to the process of this invention. The following polymerization recipe was used in the run.

| | Parts by weight |
|---|---|
| Butadiene | 75 |
| Styrene | 25 |
| Cyclohexane | 780 |
| n-Butyllithium, millimoles | 1 4 |
| Diethyl ether | 25 |
| Time, hours | 2 |
| Temperature, °C. | 50 |

1 Millimoles per 100 parts of monomers.

The conversion in this run was 94 percent, and the copolymer product had an inherent viscosity of 0.97. The refractive index of this polymer at 25° C. was 1.5331, indicating a bound styrene content of 25 weight percent.

The polymer so prepared was subjected to an oxidation procedure which destroyed that portion of the polymer molecule containing unsaturation (polybutadiene). This oxidation method is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular fragments such as polystyrene containing no ethylenic bonds remain unattacked. The small fragments (low molecular weight aldehydes) and the very low molecular weight polystyrene fragments of the copolymer are soluble in ethanol whereas an unattacked fairly high molecular weight polystyrene fragment of the copolymer is insoluble in ethanol.

Approximately 0.5 gram of the copolymer prepared as described above was cut into small pieces, weighed to within 1 milligram, and charged to a 125 ml. flask. Forty to fifty grams of p-dichlorobenzene was then charged to the flask, and the flask contents were heated to 130° C. The flask was maintained at this temperature until the polymer present had become dissolved. The solution was then cooled to 80 to 90° C., and 8.4 ml. of a 71.3 percent by weight aqueous solution of tert-butyl hydroperoxide was added. One milliliter of 0.003 molar osmium tetroxide in toluene was then added to the flask contents, and the resulting solution was heated to between 110 and 115° C. for 10 minutes. The solution was then cooled to between 50 and 60° C., after which 20 ml. of toluene was added and the solution was poured slowly into 250 ml. of ethanol containing a few drops of concentrated sulfuric acid. About 0.9 weight percent of polystyrene which coagulated out of solution was recovered. When a block polymer prepared as described in Example II is subjected to this treatment, from about 17 to 20 weight percent of polystyrene is recovered.

As previously mentioned, the amount of styrene going into the polymer chain increases with conversion. Since the amount of styrene present as compared to the amount of butadiene present is quite large when conversion levels of 85 to 95 percent are reached, a polystyrene unit is formed in the polymer chain which is of sufficiently high molecular weight to be recovered by the above-described oxidation method. A few butadiene molecules can be attached to this polystyrene unit since butadiene is present until 100 percent conversion is reached. The formation of the polystyrene unit can be inhibited by stopping the copolymerization, e.g., by the addition of an alcohol, at a conversion below about 85 to 90 percent.

EXAMPLE VI

Another series of runs was carried out in accordance with the process of this invention. In these runs, isoprene-styrene copolymers were prepared by polymerizing these monomers according to the following recipe.

| | Parts by weight |
|---|---|
| Isoprene | 75 |
| Styrene | 25 |
| Cyclohexane | 390 |
| Ethyl ether | 25 |
| n-Butyllithium | Variable |
| Temperature, °C. | 50 |
| Time, hours | 16 |

The results of these runs are set forth hereinbelow in Table V.

Table V

| Run No. | 52 | 53 |
|---|---|---|
| Butyllithium: | | |
| parts by weight | 0.26 | 0.23 |
| millimoles | 4.0 | 3.5 |
| Conversion, percent | 106 | 104 |
| Inherent Viscosity | 0.95 | 1.54 |
| Refractive Index at 25° C | 1.5349 | 1.5351 |
| Styrene Content, wt. percent | 24.5 | 25.0 |
| Polystyrene Recovered, wt. percent [1] | 1.4 | (²) |

[1] Determined by the oxidation method described in Example V.
² Not measured.

The polymer product from run 52 was divided into several fractions by dissolving a polymer sample and fractionally precipitating polymers of increasing molecular weight. The procedure used was to dissolve about 20 grams of the polymer to be analyzed for homogeneity in approximately 1.5 liters of toluene. A finite amount of methyl alcohol was then added to cause precipitation of a portion of the dissolved polymer. After standing for about 24 hours, the precipitated phase was withdrawn. The polymer was then recovered from this semifluid phase by stripping off the toluene over a hot water bath and drying the polymer in a vacuum oven. Each of the fractions was precipitated and recovered in this manner and the properties determined as shown in Table VI.

Table VI

| Fraction | Wt. Percent | Inherent Viscosity | Refractive Index at 25° C. | Bound Styrene, Weight Percent |
|---|---|---|---|---|
| Original | | 0.84 | 1.5355 | 25.5 |
| I | 32.1 | 1.10 | 1.5343 | 24.0 |
| II | 18.0 | 0.97 | 1.5343 | 24.0 |
| III | 11.3 | 0.87 | 1.5340 | 23.5 |
| IV | 4.8 | 0.95 | 1.5351 | 25.0 |
| V | 4.5 | 0.75 | 1.5347 | 24.5 |
| VI | 6.5 | 0.52 | 1.5350 | 25.0 |
| VII | 0.6 | | | |
| Unrecovered | 27.2 | | | |

From a consideration of the data in Table VI, it is seen that the styrene content of the several fractions was substantially constant. This indicates that a homogeneous polymer was obtained.

EXAMPLE VII

Several runs were carried out in which butadiene and styrene were copolymerized according to this invention. The following recipe was used in these runs.

| | Parts by weight |
|---|---|
| Butadiene | 75 |
| Styrene | 25 |
| Cyclohexane | 390 or 780 |
| n-Butyllithium | Variable |
| Diethyl ether | 25 |
| Temperature, °F. | 122 (50° C.) |
| Time, hours | Variable |

The results of these runs are set forth hereinbelow in Table VII.

Table VII

| | Run No. | | | |
|---|---|---|---|---|
| | 54 | 55 | 56 | 57 |
| n-Butyllithium: | | | | |
| parts/100 parts monomer | 0.26 | 0.19 | 0.18 | 0.18 |
| millimoles/100 parts monomer | 4.0 | 3.0 | 2.75 | 2.75 |
| Cyclohexane, pts./100 pts. monomer | 780 | 390 | 390 | 390 |
| Diethyl ether, pts./100 pts. monomer | 25 | 25 | 25 | 25 |
| Time, hours | 4 | 3 | 3 | 0.5 |
| Conversion, percent | 86 | 100 | 100 | 70 |
| Mooney Viscosity, ML-4 | 35 | 14 | 109 | 52 |
| Inherent Viscosity | 1.55 | 1.03 | 2.21 | 1.81 |
| Refractive Index at 25° C | 1.5320 | 1.5349 | 1.5349 | 1.5308 |
| Bound Styrene, percent | 21 | 24 | 24 | 19.5 |
| Unsaturation, by infrared analysis, percent | | | | |
| cis | 19 | 19 | 17 | 18 |
| trans | 34 | 31 | 31 | 34 |
| vinyl | 26 | 25 | 27 | 28 |

A blend of the copolymers of runs 54, 55 and 56, the copolymer of run 57, and a sample of a butadiene-styrene copolymer prepared by a typical emulsion polymerization were converted into compounded rubber stocks according to the recipes shown below. The blend was made up of 29.9 percent of copolymer from run 54, 44.2 percent of copolymer from run 55, and 27.7 percent of copolymer from run 56. The blend of runs 54, 55 and 56 is designated as A, run 57 is B and the butadiene-styrene copolymer is designated as C.

| | Parts by Weight | | |
|---|---|---|---|
| | A | B | C [1] |
| Polymer | 100 | 100 | 100 |
| High abrasion furnace black | 50 | 50 | 50 |
| Zinc oxide | 3 | 3 | 3 |
| Stearic acid | 2 | 2 | 1 |
| Antioxidant ² | 1 | 1 | 1 |
| Aromatic oil (plasticizer) | 10 | 15 | 10 |
| Sulfur | 1.75 | 1.75 | 1.75 |
| Vulcanization accelerator ³ | 1.2 | 1.3 | 1.2 |
| Mill temperature, °F | 158 | 200 | 125 |

[1] Butadiene-styrene copolymer prepared by emulsion polymerization at approximately 41° F., using a rosin acid soap emulsifier and a ferrous sulfate-sodium formaldehyde sulfoxylate activator and containing about 23.5 weight percent bound styrene.
² Physical mixture containing 65 percent of a complex diarylamine-ketone reaction product and 35 percent of N,N'-diphenyl-p-phenylenediamine.
³ N-cyclohexyl-2-benzothiazylsulfenamide.

Physical properties of the raw compounded stocks and of the compounded stocks cured for 30 minutes at 307° F. and oven aged for 24 hours at 212° F. were determined. These properties are set forth hereinbelow in Table VIII in which A, B, and C refer, respectively, to compounded stocks containing the blend of copolymers of runs 54, 55 and 56, the copolymer of run 57, and the emulsion polymerized polymer.

Table VIII

|  | Raw Compounded Stocks | | | 30 Min. Cure @ 307° F. | | | Oven aged 24 hours @ 212° F. | | |
| --- | --- | --- | --- | --- | --- | --- | --- | --- | --- |
|  | A | B | C | A | B | C | A | B | C |
| Mooney Viscosity:[1] | | | | | | | | | |
| ML-4 | 44 | 64 | 52 | | | | | | |
| MS 1½ at 212° F | 33.5 | 26 | 36 | | | | | | |
| Scorch at 280° F.[2] | | | | | | | | | |
| Minimum ML-4 | 31 | not det. | 37 | | | | | | |
| 5 point rise, minutes | 14.5 | not det. | 26 | | | | | | |
| Extrusion at 250° F.[3] | | | | | | | | | |
| in./min | 52.5 | 59.0 | 43.5 | | | | | | |
| g./min | 101.0 | 126.5 | 110 | | | | | | |
| g./in | 1.92 | 2.13 | 2.53 | | | | | | |
| Rating | 12 | 11 | 11 | | | | | | |
| 2×10⁴ moles/cc.[4] | | | | 1.36 | 1.11 | 1.52 | | | |
| Compression Set, percent[5] | | | | 15.0 | 15.5 | 20.9 | | | |
| 300% Modulus, p.s.i.[6] | | | | 1,550 | 1,350 | 1,425 | 2,220 | 2,150 | 2,410 |
| Tensile, p.s.i.[6] | | | | 3,150 | 2,675 | 3,685 | 2,460 | 2,480 | 3,500 |
| Elongation, percent[6] | | | | 490 | 450 | 555 | 320 | 335 | 390 |
| 200° F. Maximum tensile, p.s.i.[6] | | | | 1,300 | 1,180 | 1,840 | | | |
| Hysteresis, ΔT, ° F.[7] | | | | 63.8 | 66.6 | 67.6 | 56.5 | 54.7 | 54.7 |
| Resilience, percent[7] | | | | 67.6 | 67.4 | 64.6 | 69.7 | 70.8 | 64.6 |
| Flex life, M[7] | | | | 21.5 | 12.0 | 31.4 | 3.4 | 3.6 | 3.3 |
| Shore A Hardness:[8] | | | | | | | | | |
| 80° F | | | | 62 | 59.5 | 69.5 | 65.5 | 63 | 66 |
| 212° F | | | | 56.5 | 55 | 55.5 | 63 | 60 | 63.5 |
| NBS Abrasion, rev./mil.[9] | | | | 8.39 | 8.28 | 9.09 | | | |

[1] ASTM D927–55T.
[2] Scorch is determined on a Mooney viscometer at 280° F. using the large rotor (ML-4). The scorch time is the time required for the Mooney value to rise a given amount above the minimum. The procedure is essentially the same as described by Shearer et al., India Rubber World 117, 216-9 (1947).
[3] Extrusion is carried out at 250° F. by essentially the same procedure as described by Garvey et al., Ind. & Eng. Chem. 34 1309 (1942). As regards the "rating" figure, 12 designates an extruded product considered to be perfectly formed whereas lower numerals indicate less perfect products.
[4] Determined by the swelling method of Kraus as given in Rubber World, October 1946. This value is the number of effective network chains per unit volume of rubber. The higher the number, the more the rubber is crosslinked (vulcanized).
[5] ASTM 395-55.
[6] ASTM D412-51T.
[7] ASTM D623-55T.
[8] ASTM D676-55T.
[9] ASTM D394-47 (Method B)(NBS=National Bureau of Standards).

From an examination of the data set forth in Table VIII, it is seen that the compounded stocks (A and B) containing the copolymers of this invention gave somewhat similar physical properties. As compared to the compounded stocks (C) containing the copolymer prepared by emulsion polymerization, the compounded stocks containing the copolymers of this invention gave lower compression set and tensile, approximately equal heat build-up, higher resilience, smoother extrusions, and a shorter scorch time.

EXAMPLE VIII

Two other runs were carried out according to the procedure of the preceding examples wherein butadiene-styrene copolymer are prepared using butyllithium as the catalyst in the presence of a polar compound. The following recipes were used in these runs.

|  | Parts by Weight | |
| --- | --- | --- |
|  | Run 58 | Run 59 |
| Butadiene | 75 | 75 |
| Styrene | 25 | 25 |
| Cyclohexane | 390 | 390 |
| Diethyl ether | 25 | 25 |
| n-Butyllithium, millimoles | 4.0 | 3.0 |
| Time, hours | 4 | .4 |
| Temperature, ° F. | ¹122 | 122 |
| Conversion, percent | 98 | 100 |

¹ 50° C.

The copolymers recovered from each of these runs were separated into fractions by the method described in Example VI. The results are set forth hereinbelow in Table IX.

Table IX

| Fraction | Wt. Percent | Refractive Index at 25° C. | Bound Styrene, Wt. Percent | Inherent[1] Viscosity |
| --- | --- | --- | --- | --- |
| Run A: | | | | |
| Original | | 1.5342 | 23.2 | 0.80 |
| I | 2.50 | 1.5340 | 23.0 | 0.74 |
| II | 7.9 | 1.5345 | 23.6 | 0.77 |
| III | 19.2 | 1.5340 | 23.0 | 0.69 |
| IV | 5.8 | 1.5340 | 23.0 | 0.83 |
| V | 17.8 | 1.5342 | 23.2 | 0.67 |
| VI | 12.3 | 1.5340 | 23.0 | 0.88 |
| VIII | 11.4 | 1.5346 | 23.7 | 0.69 |
| Run B: | | | | |
| Original | | 1.5341 | 23.1 | 0.63 |
| I | 18.6 | 1.5341 | 23.1 | 0.74 |
| II | 8.4 | 1.5340 | 23.0 | 0.66 |
| III | 13.6 | 1.5342 | 23.2 | 0.62 |
| IV | 10.2 | 1.5340 | 23.0 | 0.61 |
| V | 13.5 | 1.5340 | 23.0 | 0.63 |
| VI | 18.3 | 1.5340 | 23.0 | 0.63 |
| VII | 16.3 | 1.5341 | 23.1 | 0.60 |

[1] None of the polymers contained gel.

From a consideration of the data in Table IX, it is seen that the styrene content of the several fractions was substantially constant. This indicates that homogeneous polymers were obtained.

EXAMPLE IX

A series of runs was carried out according to the procedure of Example IV, in which butadiene-styrene copolymers were prepared. The following polymerization recipe was employed in these runs:

POLYMERIZATION RECIPE

Parts by weight
Butadiene _____ 75
Styrene _____ 25
Cyclohexane _____ 780
1,2-dimethoxyethane _____ Variable
Butyllithium, millimoles _____ ¹ 4.0
Temperature, ° C. _____
Time, hours _____ Vari ¹ Millimoles per 100 parts of monomers.

The results of these runs are shown below in Table X.

TABLE X

| Run No. | Temperature, °F. | 1,2-dimethoxyethane (pts./100 pts. monomer) | Time, Minutes | Conversion, percent | Refractive Index, 25° C. | Styrene, percent |
|---|---|---|---|---|---|---|
| 58 | 86 | 0.18 | 5 | 24 | 1.5211 | 15.4 |
| 59 | 86 | 0.18 | 12 | 46 | 1.5253 | 19.8 |
| 60 | 86 | 0.18 | 17 | 59 | 1.5262 | 21.2 |
| 61 | 86 | 0.18 | 30 | 82 | 1.5272 | 22.2 |
| 62 | 86 | 0.18 | 45 | 92 | 1.5268 | 21.8 |
| 63 | 86 | 0.18 | 60 | 98 | 1.5290 | 24.3 |
| 64 | 86 | 0.09 | 16 | 41 | 1.5249 | 19.1 |
| 65 | 86 | 0.09 | 30 | 49 | 1.5251 | 18.5 |
| 66 | 86 | 0.09 | 45 | 62 | 1.5256 | 20.0 |
| 67 | 86 | 0.09 | 60 | 82 | 1.5180 | 22.6 |
| 68 | 86 | 0.09 | 90 | 92 | 1.5286 | 23.4 |
| 69 | 86 | 0.09 | 120 | 98 | 1.5298 | 24.8 |

The rubbery polymers produced in accordance with this invention have utility in applications where natural and synthetic rubbers are used. For example, they can be used in the manufacture of automobile tires, gaskets, and other rubber articles. The polymers can also be used as an electrical insulating material.

As will be evident to those skilled in the art, many variations and modifications can be practiced upon consideration of the foregoing disclosure. Such variations and modifications are clearly believed to be within the spirit and scope of the invention.

I claim:
1. A process for preparing copolymers which comprises contacting at least two monomeric materials selected from the group consisting of 1,3-butadiene, isoprene, piperylene, vinyl-substituted aromatic hydrocarbons, vinyl halides, vinylidene halides, esters of acrylic acid and esters of homologues of acrylic acid with at least 0.02 part by weight per 100 parts by weight of said monomeric materials of an organolithium compound corresponding to the formula $R(Li)_x$, wherein R is a hydrocarbon radical selected from the group consisting of aliphatic, cycloaliphatic and aromatic radicals and $x$ is an integer from 1 to 4, inclusive, said contacting occurring at a temperature in the range of —20 to 150° C. and in the presence of a solvent mixture, which is liquid under conditions of the process, said mixture comprising (1) a hydrocarbon selected from the group consisting of aromatic, paraffinic and cycloparaffinic hydrocarbons, and (2) a polar compound selected from the group consisting of ethers, thioethers and tertiary amines, the amount of said polar compound in said mixture being in the range of 0.005 to 50 weight percent of the total mixture and recovering the rubbery copolymer so produced.

2. The process according to claim 1 in which said solvent mixture comprises cyclohexane and diethyl ether.

3. The process according to claim 1 in which said solvent mixture comprises benzene and diethyl ether.

4. The process according to claim 1 in which said solvent mixture comprises cyclohexane and triethylamine.

5. The process according to claim 1 in which said solvent mixture comprises cyclohexane and tetrahydrofuran.

6. The process according to claim 1 in which said solvent mixture comprises cyclohexane and 1,2-dimethoxyethane.

7. The process according to claim 1 in which the copolymer produced is a copolymer of 1,3-butadiene and styrene.

8. The process according to claim 1 in which the copolymer produced is a copolymer of isoprene and styrene.

9. The process according to claim 1 in which said organolithium compound is n-butyllithium.

10. The process according to claim 1 in which said organolithium compound is isopropyllithium.

11. The process according to claim 1 in which said organolithium compound is phenyllithium.

12. The process according to claim 1 in which said organolithium compound is cyclohexyllithium.

13. The process according to claim 1 in which said organolithium compound is 1,2-dilithio-1,2-diphenylethane.

14. The process according to claim 1 in which the amount of said organolithium compound is in the range of 0.1 to 2.0 parts by weight per 100 parts by weight of said monomeric materials.

15. A process for preparing copolymers which comprises contacting a mixture of 1,3-butadiene and styrene with at least 0.02 part by weight per 100 parts by weight of said mixture of n-butyllithium, said contacting occurring at a temperature in the range of —20 to 150° C. and in the presence of a solvent mixture consisting essentially of cyclohexane and diethyl ether, the amount of said ether in said solvent mixture being in the range of 0.005 to 50 weight percent of the total mixture; and recovering the rubbery copolymer so produced.

16. A process for preparing copolymers which comprises contacting a mixture of 1,3-butadiene and styrene with at least 0.02 part by weight per 100 parts by weight of said mixture of n-butyllithium, said contacting occurring at a temperature in the range of —20 to 150° C. and in the presence of a solvent mixture consisting essentially of cyclohexane and tetrahydrofuran, the amount of said tetrahydrofuran in said solvent mixture being in the range of 0.005 to 50 weight percent of the total mixture; and recovering the rubbery copolymer so produced.

References Cited in the file of this patent

UNITED STATES PATENTS

| 2,797,208 | Burke | June 25, 1957 |
| 2,849,432 | Kibler et al. | Aug. 26, 1958 |

OTHER REFERENCES

Talalay et al.: "Synthetic Rubber From Alcohol," Interscience Publishers, Inc., New York, 1945, page 147 relied upon.